United States Patent
Ehrreich

[15] 3,648,937
[45] Mar. 14, 1972

[54] METHOD OF MAKING SMALL PLASTIC PARTICLES

[72] Inventor: John E. Ehrreich, Wayland, Mass.
[73] Assignee: Ercon, Inc., Cambridge, Mass.
[22] Filed: Aug. 8, 1969
[21] Appl. No.: 848,688

[52] U.S. Cl. ................................................ 241/15, 241/22
[51] Int. Cl. .............................................................. B02c 23/06
[58] Field of Search ............................... 241/15, 14, 16, 22

[56] References Cited

UNITED STATES PATENTS 2,402,167  6/1946  Lang .................................... 241/22 X
2,814,075  11/1957  Dasher ................................. 241/22 X Primary Examiner—Donald G. Kelly
Attorney—Cesari & McKenna

[57] ABSTRACT

A process for the comminuting of small particles of organic materials, especially polymeric materials, the process comprising the steps of dispersing a particulate material in a mass of the organic material to be comminuted, comminuting the material, and—in the more usual situation—removing the particulate material from the comminuted organic material to leave an uncontaminated particulate product.

10 Claims, No Drawings

METHOD OF MAKING SMALL PLASTIC PARTICLES

BACKGROUND OF THE INVENTION

There are a number of industrial uses for small particles of organic polymers. First of all, such particles are necessary to form latex-like dispersions of many polymeric materials. Moreover, the particulate form of polymers makes them much more readily dispersible in solvents for facile formation of coating solutions and the like. Indeed, in many circumstances, it is a practical impossibility to dissolve any substantial amount of chemically-resistant polymers unless the polymers are provided in extremely small particulate size so that the total surface area of polymer per unit mass of polymer is very large.

Another use of such particulate organic fillers is in the modification of the physical properties of various composite materials. In this application, the particulate organic fillers are incorporated into other materials, for example other polymers, to obtain the desired modification in properties.

Heretofore it has been a problem in the art to provide small particulate polymeric materials without excessive cost and without excessive thermal or mechanical damage to the polymer materials themselves. The conventional procedures for producing such plastic powders have been those of grinding, hammer milling, crushing, and the like. Oftentimes, it has been necessary to prefreeze the polymers so that they might be subjected to mechanical comminuting action below their brittle points or below their secondary transition temperatures. Obviously, both of the aforesaid techniques require high-capital cost equipment and/or high operating expense. Another technique used in the art has been the polymerization of monomers into polymers in powder form. Although the powder formed during such polymerization processes is very fine, there is the additional problem of adding to that powder — in intimate admixture — adjuvants such as antioxidizing agents, pigments and the like.

Moreover, often an ideal particle size and shape cannot be obtained by the foregoing processes. This is because the particular rheological properties of some polymers under shear often tend to give an excessively elongated, or flake-like, shape to the resultant particle. Consequently, even particles formed on such high capital cost equipment as Banbury Mills and the like, are often not advantageous for use in a given application, such as (1) the rapid formation of solutions without temporary, but excessive, viscosity buildup before the solution is complete or (2) the formation of dispersions having suitable viscosity characteristics.

It is often necessary, because of the very high cost of suitable comminuting equipment, to ship solutions containing low polymer solids content rather than to merely ship the material itself which, were it available in a convenient particulate form, could be dissolved to form the desired solution at the point of use.

SUMMARY OF THE INVENTION

Therefore, it is a principal object of the invention to provide an improved process for forming small organic particles.

It is another object of the invention to provide a process for forming small particles at reasonable temperatures and under relatively mild processing conditions.

It is a further object of the invention to provide a process whereby small polymeric particles can be formed without excessive degradation or modification of polymer properties during the formation of the particles.

Other objects of the invention will be obvious to those skilled in the art on reading the instant specification.

The above objects have been substantially achieved by utilizing a process comprising the steps of forming a mixture of small filler particles and the organic material to be comminuted, the subjecting the mixture to a comminuting action to form a composite powder material, and removing the filler particles from said powder. A particular advantage of the invention is that its practice will not only tend to give "improved results" over those obtained using more conventional comminuting methods, but that its practice will also make practical the use of less massive apparatus than heretofore generally useful for forming small polymeric particles. For example, it has been found that small particles can be formed according to the invention by merely incorporating the filler material into the polymer under relatively low-shear mixing techniques, e.g. such as a two-roll mill, and then subjecting the resultant mixture to the action of a relatively simple comminuting equipment such as a Waring Blender.

The organic material to be comminuted can be any organic material which is available in a relatively large particle size. From an economic point of view, the materials in which there is most industrial interest will be those plastic materials which are generally known as thermoplastics or thermosetting resins. It is also intended that the term plastics as used herein include those elastomeric resins, both vulcanized and nonvulcanized, which are known to the art. Among some of the plastic materials which can be subjected to comminuting action by the process of the invention are epoxy resins, polyolefin materials, such as polyethylene and polypropylene. Other ethylenically-unsaturated polymers such as polyvinyl chloride, polystyrene, polyacrylonitrile, polymethylmethacrylate, polyvinylidine chloride, polytetrafluoroethylene, polyurethanes, polycarbonates, polyacetales, polyphenylene oxide, polyterephthalates, thermosetting phenolic resins, poly (diallylphthalate), the silicone rubbers and the like. Those skilled in the art will, on reading this specification, be able to extrapolate this list to include many other polymeric materials, indeed, most of the other solid polymeric materials known to the art. By small filler particles I mean to include any small filler particle, but most advantageously, those filler particles whose tendency to break on impact is greater than the tendency of the polymer itself to break on impact. This is because it has been found that the break in the filler particle, say sodium chloride crystal, will proceed through the sodium chloride crystal, through the interface between the sodium chloride and the polymer with which it has been compounded, and propagate directly into the polymer directly opposite the crack initiated in the sodium chloride.

Moreover, in selecting a small filler particle, some attention should be given to the probable necessity of removing that particle form the polymer powder before the polymer powder is readied for use. Thus, water soluble inorganic salts such as sodium chloride, calcium chloride, potassium chloride, ammonium nitrate, potassium sulfate, and the like are most suitable because water leaching of the comminuted material usually removes such salt at optimum economic costs. However, organic salts, e.g. sodium acetate, can also be used in the process of the invention. They too are preferably water soluble, or soluble in some solvent which is relatively inert with respect to the polymer being comminuted. Other small filler particles, which are not salts, but which are friable, may also be used. For example, sugar, such as sucrose, may be used as a small filler particle in the process of the invention.

It is also to be noted that where water leaching is for some reason undesirable, other methods can be used to separate the filler and the polymer powder. For example, separation based on size and specific gravity factors (e.g. as achieved by use of an appropriate cyclone classification system) can be suitably utilized.

The comminuting action can be achieved by placing only pieces of the filler-loaded polymer in the comminuting apparatus, or when it is found desirable, the filler-loaded polymer can be comminuted in a liquid medium. This latter method has the advantage of minimizing local overheating and consequent degradation of the polymer being comminuted.

In general, it is preferred that the filler materials be susceptible to brittle fracture rather than ductile fracture. It is found that most suitable crystalline fillers have cleavage planes of low indices or high atomic density such as (0001) (111) (001) planes. The average particle size of the filler material in the composition to be comminuted is fine, but preferably below 0.01 inch in average diameter, and is loaded into the composition in a volume % of from 25% parts filler to very nearly 100% based on the volume of the entire composition. Often, however, it is found that material to be comminuted has a shape factor resulting in a relatively large surface area, and therefore, somewhat larger size particles are found to be more effective than would otherwise be the case.

The shape of the brittle filler material is advantageously 3-dimensional (e.g. cubic, spherical, tetragonal, etc.) rather than two-dimensional (e.g. flake-like). This three-dimensional shape factor is important in that it apparently maximizes the probability that a fracture of the filler will take place on impact thereof in a comminuting device. Consequently, the necessary dwell time of the organic material being comminuted in the comminuting machine is shortened and any mechanically induced degradation of the organic material is further minimized.

In one embodiment of the invention, use is made of the hygroscopic nature of such particulate fillers as lithium chloride, calcium chloride and the like to obtain particles of hydrophobic organic materials. In this embodiment, the salt, say calcium chloride, is loaded into the hydrophobic polymer, say a butadiene-styrene copolymer, to about 40% by volume. The resulting composition is exposed to moisture under such conditions, say several hours at 80% humidity and 30° C., to allow the salt to pick up a large quantity of water. The resulting hydrated composition is then frozen and, when subsequently comminuted at low temperatures below about 32° F., the presence of ice crystals aid in breaking up the plastic particles.

In order to point out more fully the nature of the present invention, the following specific examples are given as illustrative embodiments of the novel process and products of the invention.

Illustrative Embodiment of the Invention

EXAMPLE I

The following silicone resin system was formulated. The resin is identified by the trade designations of the General Electric Company.

| | |
|---|---|
| RTV 615A resin | 18 parts |
| RTV 615B resin | 2 parts |
| Alumina (Alcoa T61) | 60 parts |
| KCL crystals | 160 parts |

Alcoa T61 is a trade name of the Aluminum Corporation of America.

The above formulation was cured in an oven at 400° F. for a period of 15 minutes. The cured material was subjected to attrition in a Waring Blender of 1-quart capacity, using the high-speed setting, and a quantity of 500 grams of water at 60° C. The resultant particulate material was washed several times with water to remove the salt and dried out to form a very fine silicone powder.

EXAMPLE II

The material formed in Example I above was then utilized in the following formulation:

| | |
|---|---|
| General Electric RTV 615 Resin System (4:1 resin to curing agent) | 6 parts |
| Product of Example I | 16 parts |
| Silver flake | 10 parts |

The above formulation was mixed, pressed and cured into a 4½ × 4½ sheet for 20 minutes at 350° F. The sheet was electrically conductive.

The Silver flake utilized was that sold under the trade designation Silflake 135 by Handy and Harman Company.

EXAMPLE III

A quantity of 20 parts by weight of an uncured silicone rubber sold under the trade designation Silastic 55V by Dow Corning Corporation was mixed in a Brabender mixer with 0.3 parts of dicumyl peroxide curing agent sold under the trade designation DiCUP (R) by Hercules, Inc. and, then, 60 grams of alumina sold under the trade designation T61 by Alcoa.

Twenty-five parts by weight of the resulting mixture was mixed with 50 parts of fine KCl crystals. The mix was passed through a 14-mesh screen and subsequently cured in an oven at 400° F. for 2 hours. This cured material was comminuted in a Waring Blender as described in Example I. The KCl was dissolved out of the comminuted material with four warm water rinses. Then the resultant salt-free silicone polymer powder was oven dried.

EXAMPLE IV

The procedure set forth in Example I was repeated using calcium chloride as the particulate filler material. Substantially the same results were achieved.

EXAMPLE V

Six parts of polyethylene pellets sold under the trade designation Alathon 14 by E.I. DuPont de Nemours and Co. and 94 parts of a finely ground NaCl were mixed in a Brabender mixer at 250° F. for 4 minutes.

The resultant material was cooled, dispersed in water and subjected to comminuting in a Waring Blender. Subsequently, the material was dried and washed four times with warm water. The polyethylene powder was filtered and dried.

EXAMPLE VI

Fifty parts by weight of solid, amine-type curing agent, useful in forming cured epoxy resins and sold under the trade designation EpiCure 844 by Jones-Dabney Company, was mixed with 450 parts of fine KCl crystals at 450° F. The material so mixed was spread on a cold surface, then comminuted in a Waring Blender, rinsed with warm water several times, and air dried. The resultant material was a finely divided powdery amine curing agent.

EXAMPLE VII

The procedure described in Example VI was repeated using, instead of EpiCure 844, another resinous epoxy, sold under the trade designation EpiRez 530C by Jones-Dabney.

EXAMPLE VIII

Nine parts by weight of an epoxy resin sold under the trade designation DER 331 by Dow Chemical Company, 1 part of phenyl glycidyl ether and 1.4 parts of triethylene tetramine were mixed together at 25° C.

Ten parts by weight of the resultant mixture were mixed with 90 parts of silver flake (Silflake 135) and, then, with 90 parts of finely divided KCl crystals. The resulting KCl-filled mix was cured in an oven for 15 minutes at 150° C. before being ground and freed from the salt component in a Waring Blender as has been described above. Cured epoxy resin powder was recovered after drying the salt-free material in an air oven.

EXAMPLE IX

A quantity of 254 parts by weight of a green-pigmented poly (vinyl chloride) resin composition was prepared on a hot two-roll mill with a 325° F. roll temperature. Then 1,350 parts of NaCl were milled into the resin, and the resultant mixture was cooled.

About 300 grams of the cooled composition was comminuted in a 1-quart capacity Waring Blender. The salt was dissolved out of the comminuted mass with about seven hot-water washes. The resultant material was a very finely-powdered, green, poly (vinyl chloride) - based, polymer composition.

It is, of course, to be understood that the foregoing examples are intended to be illustrative, and that various changes can be made in the ingredients, proportions and conditions set forth herein without departing from the spirit of the invention as defined in the appended claims.

What is claimed is:

1. A process of forming small particles of an organic polymeric material selected from the group consisting of plastic and elastomeric materials, said process comprising the steps of:
   a. making a solid particle-loaded composition comprising small filler particles within a matrix of said polymeric material and
   b. subjecting said composition to a comminuting action to form an organic polymeric powder.
2. The process of claim 1 comprising the additional step of removing said filler particles from said powder.
3. A process as defined in claim 2 wherein said filler particle is a water-soluble inorganic salt.
4. A process as defined in claim 2 wherein said filler particle is a water-soluble organic compound.
5. A process as defined in claim 2 wherein the average diameter of the filler particles before comminuting is up to 0.10 inches.
6. A process as defined in claim 1 wherein said polymeric material is a thermoplastic resin.
7. A process as defined in claim 1 wherein said comminuting action is carried out in the presence of a solvent for said filler particles.
8. A process as defined in claim 1 wherein said filler particle is less resistant to fracture on impact than is said organic material.
9. A process as defined in claim 1 wherein said filler comprises at least 25% by volume of the mixture to be subjected to comminuting action.
10. A process as defined in claim 1 wherein said organic polymeric material is a thermosetting resin.

* * * * *